Patented Aug. 6, 1946

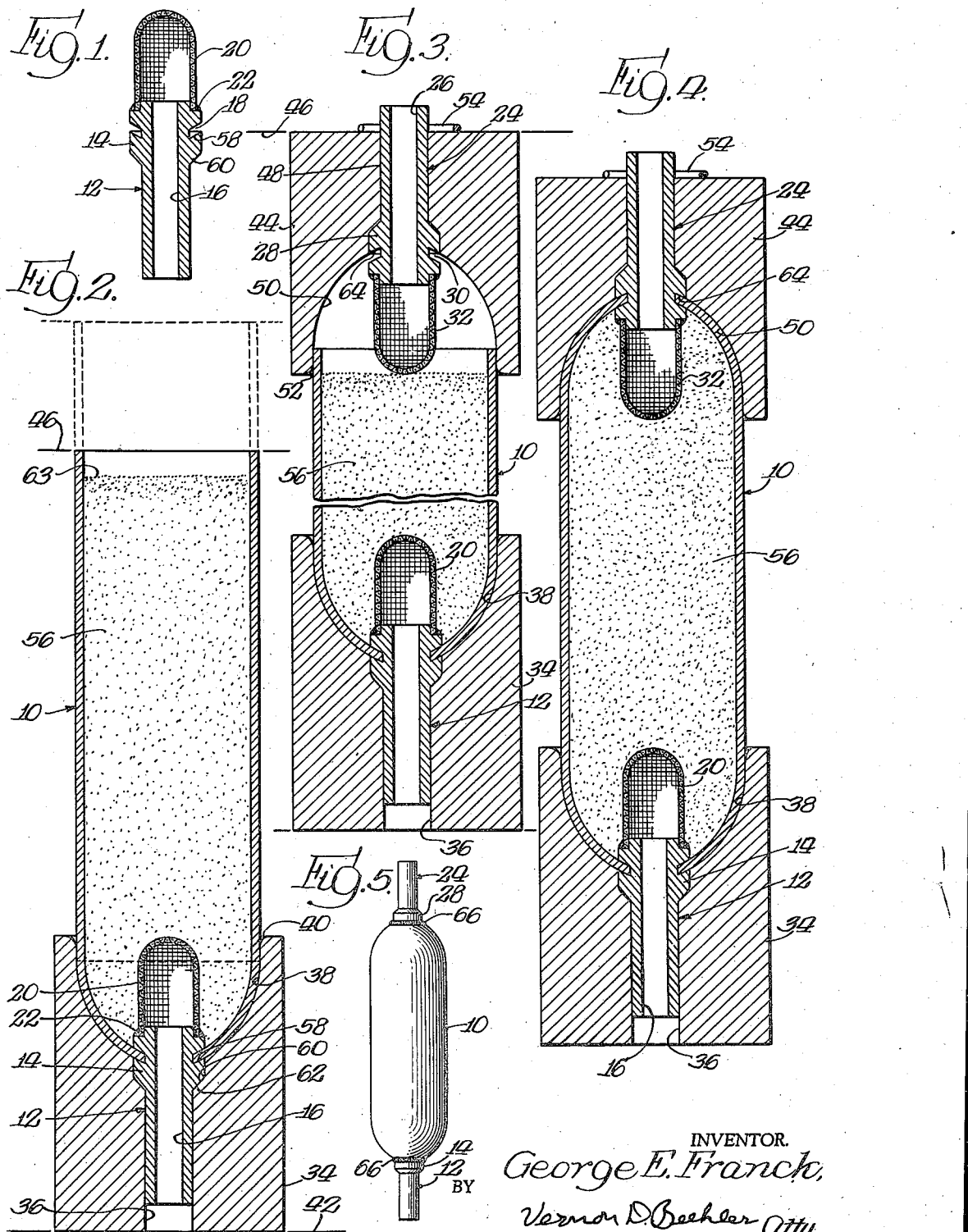

2,405,201

UNITED STATES PATENT OFFICE 2,405,201

METHOD OF FORMING CLOSED METAL CAPSULES

George E. Franck, Riverside, Ill., assignor to The Imperial Brass Manufacturing Company, Chicago, Ill., a corporation of Illinois Application August 29, 1942, Serial No. 456,649

6 Claims. (Cl. 29—148.2)

My invention relates to a method of forming closed metal capsules or containers of the kind which are customarily inserted in fluid lines carrying liquids or gases under considerable pressure. The device finds ready application in refrigeration lines under which circumstances it is frequently filled with a dehydrating chemical and provided with screens for confining the chemical to the capsule.

An object of my invention is to provide a new and improved method of forming a metal container which reduces the quantity of metal required to secure the several parts together substantially to a minimum quantity without sacrificing strong tight joints sufficient to withstand a pressure in excess of that which might burst the walls of the container.

Another object of my invention is to provide a new and improved method of die forming a tubular body having fitting assemblies providing passages at the closed ends whereby a tubular metal body is simultaneously contracted and closed at the ends and in the same operation joined with suitable recesses in the fitting assemblies so that in substantially one operation, the entire container is formed and made ready for the reception of a sealing medium in such a manner that it may be unnecessary to use a sealing medium initially for the purpose of tying the various parts of the device together at the joints.

With these and other objects in view, my invention consists in the construction, arrangement and combination of the various steps of my method together with parts of my device whereby the objects contemplated are attained, as hereinafter more fully set forth, pointed out in my claims and illustrated in the accompanying drawing, in which:

Figure 1 is a longitudinal section of a fitting assembly;

Figure 2 is a longitudinal section through a lower die member showing a metal tube contracted and joined with one of the fitting assemblies;

Figure 3 is a vertical sectional view showing the metal tube joined to a lower fitting assembly and an upper die member in position prior to forcing the metal tube into engagement with an upper fitting assembly;

Figure 4 is a longitudinal sectional view similar to Figure 3 at the completion of a forming operation; and Figure 5 is an elevational view of the assembled device drawn to a smaller scale.

In the manufacture of small containers for use as dehydrators, strainers, scale traps and the like in refrigeration lines, there exists the necessity of providing a compact unit which is sufficiently strong and rigid so that it will withstand the high pressures exerted by refrigeration gases in a system. These systems, of course, are of necessity made up of different units having connections thereon joined together by tubing and the problem arises in making the connections on the various units gas-tight. In the past, flanges have been used in some instances and in other instances threaded joints, but there are occasions when such methods of joining become impractical. It is also necessary when employing the last mentioned type of joints to use a considerable amount of metal, thereby increasing the weight of the device and adding to its cost. In other instances, hard solder has been employed in order to join different parts of a device with a leak proof connection, but it is common knowledge that hard solder must be used at rather high temperatures, in fact so high that the metal parts which are usually of brass or copper are heated to such an extent that the structure of the metal is changed and made brittle and hard. The result is a joint more subject to breakage.

The invention here disclosed is devoted to the purpose of so joining the various metal parts of a container for dehydrating substances that the quantity of metal in the various parts is held substantially to a minimum but which so joins the various parts that they are firmly held together and need only a sealing medium of the nature of soft solder in order to effectively seal the joints against the passage of gas under high pressure.

The steps of my method are illustrated by the several views of the drawing which show in addition a practical embodiment of my invention.

In the drawing there is shown a length of hollow metal tubing 10 which is initially squared off at both ends. At the lower end, as viewed in Figures 2, 3, and 4, there is provided a fitting assembly 12 which includes an elongated piece of metal having at its upper end an enlargement 14, and a central passage 16. As shown particularly in Figure 1, an annular slot 18 is cut in the enlargement at the upper end of the fitting assembly and this slot is made so that it slopes obliquely in a downward direction from the outside surface inwardly. At the top end of the fitting assembly a thimble-shaped screen 20 is mounted so that it closes the end of the passage 16 and is sealed by a ring of solder 22 to the upper end of the body of the fitting. A similar fitting assembly 24 is provided for the top side of the container, as viewed in Figures 3 and 4, which has a similar passage 26. The upper assembly is likewise provided with an enlargement 28, an oblique annular slot 30, and a thimble-shaped screen 32.

A die 34 is provided having a central aperture 36 and a cup-shaped recess 38 terminating in a beveled edge 40. The die 34 is designed to rest on a platen 42. An upper die 44 is also provided designed to rest against an upper platen 46. In the upper die there is also provided a central aperture 48, and a curved recess 50 having a similar beveled edge 52. In addition, the upper die is provided with a spring clip 54, adjacent the outside end of the aperture 48. When completed, the container is filled with a granular substance 56 which may be, for example, silica gel, or some similar chemical which will be useful for a given purpose in a liquid or fluid line.

In the exercise of my method, dies 34 and 44 are provided as shown and positioned usually upon upper and lower platens. A fitting assembly such as the assembly 12 is then made up by cutting an obliquely disposed annular slot 18 in an enlarged end, and thereafter applying the thimble-shaped screen 20 to the end and securing it thereto by a ring of solder. The thimble-shaped screen completely encloses the upper or inside end of the passage 16. The fitting assembly is then inserted into the aperture 36 in the lower die to the position shown in Figure 1. It will be noted that in the position there shown an outer-most edge 58 of the slot 18 is substantially flush with the surface of the recess 38. The fitting assembly is held in that position in the die by contact of a lower face 60 on the enlargement with a corresponding shoulder 62 within the aperture in the lower die member.

After the fitting assembly has been thus placed in the die, the metallic tube 10 is cut square at both ends and the lower end inserted into the upper end of the recess 38 into which it is guided by means of the bevel 40. The flat upper platen 46 can be forced against the upper end of the tube 10 in order to force it downwardly. During this part of the operation, the lower end of the tube will be contracted and curved inwardly by the curved wall of the recess 38 until the lower edges are driven into the annular slot 18 to the position shown in Figure 2.

After the metallic tube has been joined with the lower fitting assembly, the hollow space within the tube may be filled with some granular substance to approximately the level 63, shown in Figure 2. The granular substance, of course, will be confined within the space by means of a screen 20.

Thereafter a second fitting assembly 24 is inserted into the aperture 48 in the upper platen where it is held by the spring clip 54 in the position shown in Figure 3 wherein an outer-most edge 64 of the annular slot 30 is substantially flush with the curved surface of the recess 50.

The upper die 44 is then lowered over the upper end of the metallic tube 10 so that the upper end enters the recess 50 guided thereinto by the beveled edge 52. Pressure is then exerted on the opposite platens and the dies forced together. During this part of the operation, the lower die serves as a nest for the lower portion of the container assembly while the upper edge of the metallic tube is forced and contracted around the curved surface of the recess 50 and into the annular oblique slot 30 until it occupies the position shown in Figure 4. By these operations the container is completely assembled. Thereafter the dies are separated and the container, with its fitting assemblies, is removed. After removal the joints formed at the respective slots 18 and 30 are sealed with a ring of soft solder 66 and the container is complete and ready for installation in a refrigeration line.

There has thus been provided a simply constructed container having a relative minimum number of separate parts formed by a succession of operations making an extremely simple manufacturing process.

Some changes may be made in the construction and arrangement of the parts of my device and the steps of my method without departing from the real spirit and purpose of my invention, and it is my intention to cover by my claims any modified forms of structure or method, or use of mechanical equivalents, which may be reasonably included within their scope.

I claim as my invention:

1. A method of die forming a tubular body having fittings providing passages at closed ends of said body comprising the steps of cutting an annular laterally opening slot in the outer wall of each of two fittings, inserting one of said fittings into a recessed forming die with the annular slot extending in exposed position within the recess, securing the other fitting in a second recessed forming die with the slot thereof exposed within said last recess, then forcing and contracting both ends of the tubular body and guiding and projecting said contracted ends endwise into the respective annular slots.

2. A method of die forming a tubular body having fittings providing passages at closed ends of said body comprising the steps of squaring the ends of a cylindrical length of metal tube, forming an obliquely disposed annular slot in the outer wall of each of two fittings having a width slightly greater than the thickness of the wall of the tubular body, inserting one of said fittings into a lower apertured and recessed forming die with the annular slot extending in exposed position within the recess so that the outer edge of the slot is substantially flush with the surface of the recess, placing an end of said metal tube in the recess and forcing and contracting said end into the recess, sliding said end over the surface of the recess continuing said contracting and projecting said end while being contracted endwise and obliquely into the annular slot, then securing the other fitting in an upper apertured and recessed forming die with the slot at the inner end exposed within said last recess so that the outer edge of the slot is substantially flush with the wall of the recess, then with the first forming die serving as a nest receiving the endwise thrust similarly forcing and contracting the other end of the metal tube, sliding said end over the surface of the recess and guiding and projecting said last end when contracted endwise and obliquely into said last annular slot and thereafter sealing the joints respectively between the contracted ends of the tubing and the slots.

3. A method of die forming a tubular body having fitting assemblies providing passages at closed ends of said body comprising the steps of squaring the ends of a cylindrical length of metal tube, forming an annular slot in the outer wall of each of two fittings which extends inwardly toward the axis of the fitting and in a direction obliquely from the inner toward the outer end thereof, securing a screen over the passage at one end of each fitting, forming in each of a pair of dies a recess each having a curved oblique surface conforming in direction to the outer wall of the slot in one of said fittings, providing a central aperture in said die recess and then inserting one of said fittings into the lower apertured and recessed forming die with the screen and the annular slot extending in exposed position within the recess so that the lower edge of the slot is substantially flush with the surface of the recess, placing an end of said metal tube in the recess and forcing and contracting said end into the recess and projecting said contracted end while still in the process of being contracted along the surface of the recess and obliquely into the annular slot until the end of the tube abuts the bottom of the slot, filling the space within the tube with a fluid conditioning substance, then securing the other fitting in the apertured and recessed forming die placed on the upper side with the screen and slot thereof at the lower end exposed within said recess so that the upper edge of the slot is substantially flush with the wall of the recess, then with the first forming die serving as a nest receiving the endwise thrust similarly forcing and contracting the other end of the metal tube and projecting said last contracted end obliquely into said last annular slot until the end of the tube abuts the bottom of the slot and thereafter sealing the joints respectively between the contracted ends of the tubing and the slots.

4. The method of making a tubular container having passaged connecting extensions at its ends comprising the steps of providing an open ended, metal tube of uniform diameter to form the body of the container, providing a pair of axially passaged connectors having an external diameter substantially smaller than said tube, cutting a laterally outwardly opening annular groove in the side of each of said connectors near one end thereof, and contracting each end of said tube uniformly throughout its circumference by continuous and uniform, progressively radial inturning thereof until the openings in the ends of said tube have a diameter substantially equal to the diameter of the bottom of said groove while guiding each end into the groove in one of said connectors.

5. The method of making a tubular container having passaged connecting extensions at its ends comprising the steps of providing an open ended, metal tube of uniform diameter to form the body of the container, providing a pair of axially passaged connectors having an external diameter substantially smaller than said tube, cutting a laterally outwardly opening annular groove in the side of each of said connectors near one end thereof, contracting each end of said tube uniformly throughout its circumference by continuous and uniform, progressively radial inturning thereof until the openings in the ends of said tube have a diameter substantially equal to the diameter of the bottom of said groove while guiding each end into the groove in one of said connectors, and sealing the joints between the contracted ends of said tube and said connectors.

6. The method of making a tubular container having passaged connecting extensions at its ends comprising the steps of providing an open ended, metal tube of uniform diameter to form the body of the container, providing a pair of axially passaged connectors having an external diameter substantially smaller than said tube, cutting in the side of each of said connectors near one end thereof a laterally outwardly opening groove inclining uniformly from the inside outwardly toward the adjacent end of said connector, and contracting each end of said tube uniformly throughout its circumference and progressively radially inwardly from a point inwardly of the end to the end until the opening in the end has a diameter substantially equal to the diameter of the bottom of the groove, while guiding each end into the groove in one of said connectors.

GEORGE E. FRANCK.